United States Patent [19]

Haag et al.

[11] Patent Number: 5,592,818
[45] Date of Patent: Jan. 14, 1997

[54] REVERSIBLE HYDROSTATIC TRANSMISSION WITH DUMP VALVE

[75] Inventors: Arthur F. Haag, Green Isle; William A. Byrd, Minneapolis, both of Minn.

[73] Assignee: Eaton Corporation, Cleveland, Ohio

[21] Appl. No.: 280,426

[22] Filed: Jul. 26, 1994

[51] Int. Cl.$^6$ .................................................. F16D 39/00
[52] U.S. Cl. .................................................. 60/487; 60/493
[58] Field of Search .......................... 60/487, 488, 493, 60/494, 468; 92/12.1, 58, 72; 91/497, 498; 417/273

[56] References Cited

U.S. PATENT DOCUMENTS

| | | | |
|---|---|---|---|
| Re. 28,953 | 9/1976 | Rubenstein | 60/464 |
| 1,878,862 | 9/1932 | Landenberger . | |
| 2,373,449 | 4/1945 | Beneder | 92/58 X |
| 3,360,933 | 1/1968 | Swanson et al. . | |
| 3,543,514 | 12/1970 | Reimer . | |
| 3,672,168 | 6/1972 | Salmon | 60/493 X |
| 3,782,245 | 1/1974 | Aldinger . | |
| 4,843,818 | 7/1989 | Thoma et al. | 60/488 |
| 5,094,078 | 3/1992 | Nishimura et al. | 60/487 |
| 5,136,845 | 8/1992 | Woodley | 60/494 X |
| 5,234,321 | 8/1993 | Gafvert | 92/12.1 |

*Primary Examiner*—Hoang Nguyen
*Attorney, Agent, or Firm*—L. J. Kasper

[57] ABSTRACT

A hydrostatic transmission is disclosed comprising a radial ball pump (11) and a radial ball motor (13) wherein the normal journal member (33) may be replaced by an alternative or modified journal member (33'), such that even with a reverse direction of actuation of the displacement control (49), the HST still operates in the forward direction, with no other changes required. The present invention also includes a simplified dump valve member (107) comprising a single, unitary member which may be merely inserted to its assembled position in which a pair of retention portions (123, 135) retain the dump valve, and permit it to pivot about the retention portions from an unactuated position to an actuated position.

18 Claims, 6 Drawing Sheets ial OEM customer already has its control linkage set up for movement corresponding to what is already available on the HST, there are no linkage changes required. If, on the other hand, the HST manufacturer has its pump displacement control set up to move in a direction opposite to that of the linkage being used by the vehicle OEM, it is necessary for the HST manufacturer to request the vehicle OEM to redesign and reverse the vehicle linkage to accommodate the HST linkage.

5,592,818

1
REVERSIBLE HYDROSTATIC TRANSMISSION WITH DUMP VALVE

BACKGROUND OF THE DISCLOSURE

The present invention relates to hydrostatic transmissions (HSTs), and more particularly, to such transmissions which are used in connection with the propulsion of vehicles such as lawn and garden tractors.

A typical hydrostatic transmission includes a pair of fluid displacement mechanisms, one of which functions as a pump and the other of which functions as a motor. Conventionally, the pump comprises a variable displacement hydrostatic unit, while the motor comprises a fixed displacement hydrostatic unit. Therefore, there are typically various controls associated with the pump, such as some form of displacement control, and perhaps other controls as well. One example of another control which would be present on a typical HST would be a "dump" control, which generally is well known in the art, and is used to interconnect the two sides of the hydrostatic loop (or connect both sides to the system reservoir), thus making it possible to push or tow the vehicle without having to overcome the dynamic braking effect of the hydrostatic transmission in its normal operating mode.

Although the present invention may be used advantageously with hydrostatic transmissions including various types of fluid displacement mechanisms, it is especially advantageous when the fluid displacement mechanisms comprise radial piston devices, and the invention will be described in connection therewith. As used herein, the term "radial piston" will be understood to include devices in which the piston is either a true cylindrical piston which reciprocates in a cylinder, or a ball member which reciprocates in a cylinder.

One of the problems associated with providing hydrostatic transmissions to vehicle original equipment manufacturers (OEMs) is that each OEM normally has its own preferred linkage arrangement already designed into its vehicle. For example, one OEM may utilize a pump displacement control in which depressing a foot pedal pushes or pulls a linkage member "forward" for the purpose of increasing pump displacement in a forward direction. Another vehicle OEM may have a pump displacement control in which depressing a foot pedal shifts a linkage member "rearward" to increase pump displacement in the forward direction.

Typically, the manufacturers of HSTs have provided the pumps of their transmissions with pump displacement controls which move one direction to increase pump displacement moving forward and move in the opposite direction to increase pump displacement moving in reverse. If the potential OEM customer already has its control linkage set up for movement corresponding to what is already available on the HST, there are no linkage changes required. If, on the other hand, the HST manufacturer has its pump displacement control set up to move in a direction opposite to that of the linkage being used by the vehicle OEM, it is necessary for the HST manufacturer to request the vehicle OEM to redesign and reverse the vehicle linkage to accommodate the HST linkage.

Accordingly, it is an object of the present invention to provide an improved hydrostatic transmission which can be used on a vehicle having either forward-moving linkage or rearward-moving linkage, without any substantial redesign or revision of the hydrostatic transmissions, and which

2
eliminates the need for the vehicle OEM to redesign or reverse its linkage.

The above and other objects of the invention are accomplished by the provision of an improved hydrostatic transmission comprising a housing assembly, a variable displacement radial piston pump, and a fluid pressure-operated motor disposed in the housing assembly. The radial piston pump includes displacement varying means operable to vary the displacement of the pump, including reversible control means operable to move the displacement varying means in first and second opposite directions, in response to movement of the control means in first and second opposite directions from a neutral position. The motor defines a fluid inlet and a fluid outlet, and the housing assembly defines high- and low-pressure passages in fluid communication with the fluid inlet and fluid outlet, respectively. The pump comprises a rotor assembly rotatably mounted on a journal member disposed within a journal bore defined by the housing assembly, the journal bore providing open fluid communication with both of the high- and low-pressure passages. The journal member defines high- and low-pressure pump slots in fluid communication with contracting and expanding chambers, respectively, of the pump, the journal member further defining high- and low-pressure housing slots in fluid communication with the high- and low-pressure passages, respectively, and the journal member defining a high-pressure axial bore interconnecting the high-pressure pump and housing slots, and a low-pressure axial bore interconnecting the low-pressure pump and housing slots.

The improved hydrostatic transmission is characterized by operating in a forward direction in response to movement of the control means in the first direction from the neutral position in the presence of a first journal member disposed in the journal bore wherein the axial bores are oriented generally perpendicular to the pump slots, and the housing slots are oriented generally perpendicular to the axial bores. The hydrostatic transmission is further characterized by operating in the forward direction in response to movement of the control means in the second direction from the neutral position in the presence of a second journal member disposed in the journal bore wherein the axial bores are oriented at an acute angle relative to the pump slots, and the housing slots are oriented at an acute angle relative to the axial bores.

In the typical prior art dump valve (unloading valve) arrangement, such as is shown in U.S. Pat. No. Re 28,953, the hydrostatic loop is "unloaded" by simultaneously unseating both of the anti-cavitation ball check valves. In the prior art, the mechanism which unseats the ball check valves has typically comprised structure which added substantially to the cost and complexity of manufacture and assembly of the pump. Furthermore, the typical prior art dump valve mechanism added substantially to the size of the pump and quite often involved members both internal and external to the pump housing, such that a fairly complex arrangement of seals was required.

Accordingly, it is an object of the present invention to provide an improved hydrostatic transmission including a dump valve (unloading valve) arrangement which overcomes the above-described disadvantages of the prior art.

The above and other objects of the invention are accomplished by the provision of a hydrostatic transmission comprising a housing assembly, a fluid pressure-operated pump, and a fluid pressure-operated motor disposed in the housing assembly. The pump defines a fluid inlet and a fluid outlet and the motor defines a fluid inlet and a fluid outlet. The housing assembly defines a case chamber, a first passage providing fluid communication from the pump fluid outlet to the motor fluid inlet, and a second passage providing fluid communication from the motor fluid outlet to the pump fluid inlet. A first check valve means is operable to permit fluid communication from the case chamber to the first passage in the absence of fluid pressure in the first passage, and a second check valve means is operable to permit fluid communication from the case chamber to the second passage in the absence of fluid pressure in the second passage. A dump mechanism is operably associated with the first and second check valve means to open both of said check valve means simultaneously in response to an input.

The improved hydrostatic transmission is characterized by the housing assembly defining an insertion chamber adjacent said case chamber and in open communication therewith, and further defining retention means, the insertion chamber being disposed between the case chamber and the retention means. The dump mechanism comprises a unitary dump member including a dump portion including first and second projecting portions disposed for unseating engagement with the first and second check valve means, respectively, in response to movement of the dump portion toward the check valve means. The unitary dump member further includes a pair of resiliently deflectable mounting portions, each including a retention member, the mounting portions being deflectable during insertion thereof through the insertion chamber until the retention members engage the retention means, the unitary dump member thereafter being pivotable about the retention members. The dump mechanism includes means biasing the dump portion away from the check valve means, and the dump mechanism includes means operable in response to the input to cause the dump member to pivot about the retention members and move the projecting portions toward the check valve means.

DESCRIPTION OF THE PREFERRED EMBODIMENTS

Figure 1:
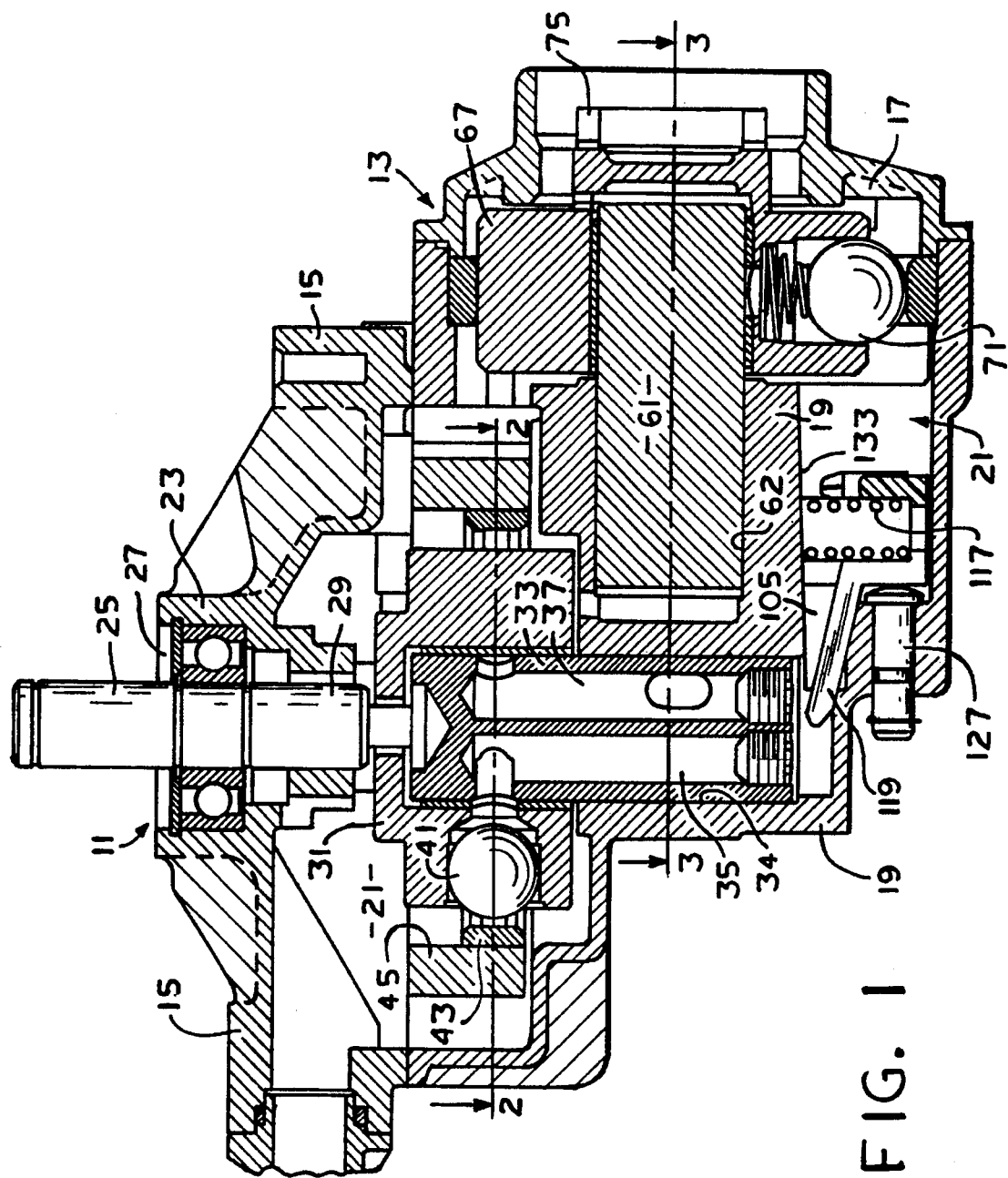
FIG. 1 is an axial cross-section of a hydrostatic transmission of the type with which the present invention may be utilized.

Referring now to the drawings, which are not intended to limit the invention, FIG. 1 is an axial cross-section of a hydrostatic transmission of the type with which the present invention may be utilized. The hydrostatic transmission may be made generally in accordance with the teachings of U.S. Pat. No. 5,234,321, assigned to the assignee of the present invention and incorporated herein by reference. A hydrostatic transmission comprises a hydrostatic pump, generally designated 11, and a hydrostatic motor, generally designated 13. The pump 11 includes a pump cover 15, while the motor 13 includes a motor cover 17, and the pump 11 and motor 13 share a common manifold body 19. The pump cover 15, motor cover 17, and manifold body 19 are joined together by a plurality of bolts not shown herein, to comprise a housing assembly, and to define therein a hydrostatic transmission case 21 (also referred to hereinafter as a "case chamber"). Preferably, the hydrostatic transmission, as shown in FIG. 1, comprises a self-contained, stand alone unit.

Figure 2:
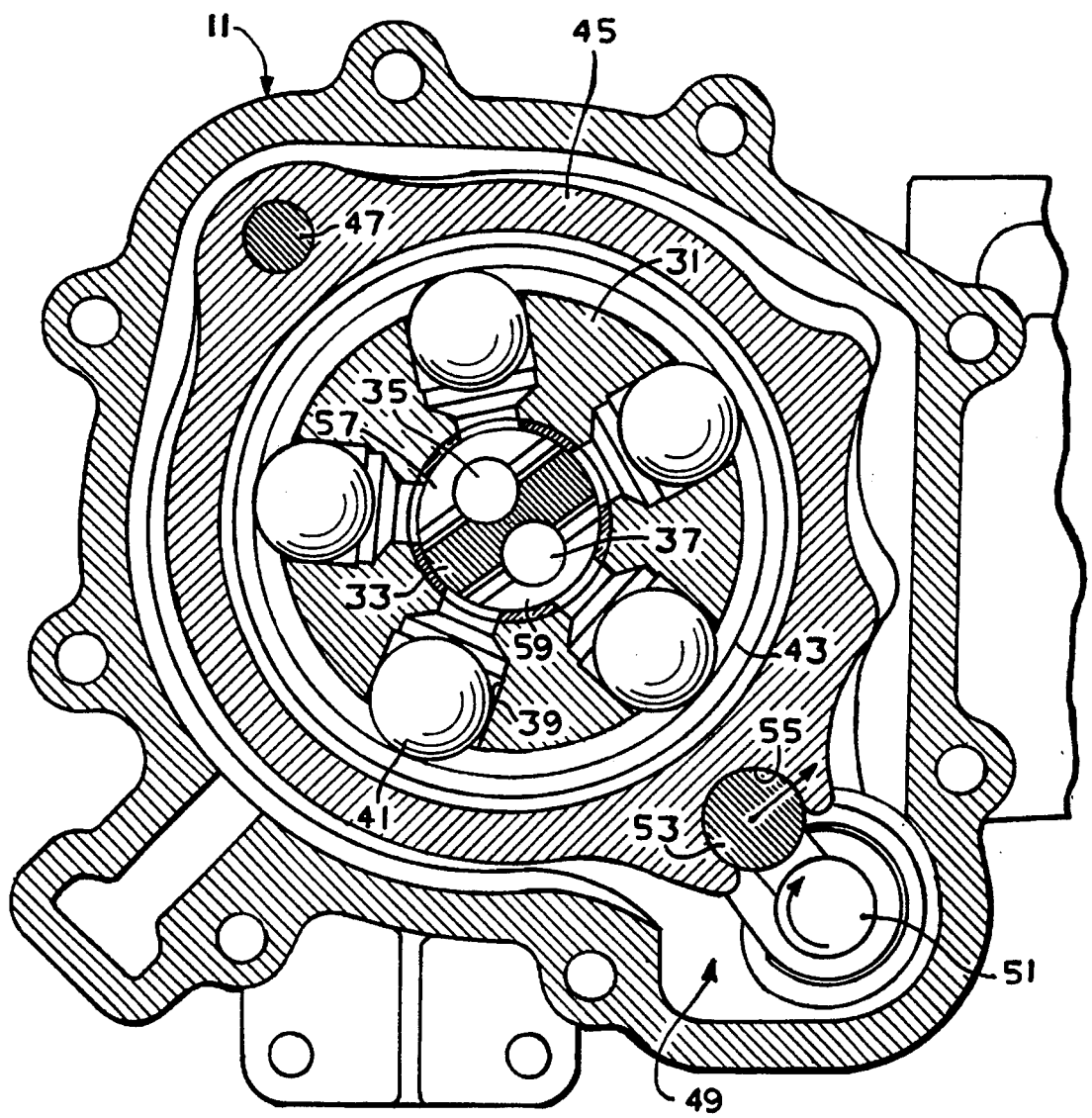
FIG. 2 is a transverse cross-section, taken on line 2—2 of FIG. 1, and on the same scale.

Referring now to FIG. 2, in conjunction with FIG. 1, the pump cover 15 defines an input hub portion 23, within which is disposed an input shaft 25, rotatably supported within the hub portion 23 by means of a bearing set 27. Typically, the input shaft 25 has an input pulley (not shown in FIG. 1) keyed to the input shaft, or attached in some other suitable means, by means of which engine torque is transmitted to the hydrostatic pump 11. At its inner end (bottom end in FIG. 1), the input shaft 25 includes a terminal portion 29 through which a drive pin (not shown in FIG. 1) extends, transverse to the axis of rotation of the input shaft 25, the function of the drive pin being to engage a cut out portion of a pump rotor 31. Therefore, rotation of the input shaft 25 drives the pump rotor 31.

The pump rotor 31 is disposed about a cylindrical support member 33 (also referred to hereinafter as a journal member), which is press-fit into a cylindrical journal bore 34 in the manifold body 19. The support member 33 defines a pair of axially-extending bores 35 and 37 (see also FIG. 2). The bore 35 comprises a low pressure inlet passage, and the bore 37 comprises a high pressure outlet passage, assuming rotation of the pump rotor 31 in a clockwise direction as viewed in FIG. 2. As is well known to those skilled in the art, if the direction of rotation of the pump rotor 31 were reversed, the bore 35 would be the high-pressure outlet passage, and the bore 37 would be the low pressure inlet passage.

The pump rotor 31 defines a plurality of cylinder bores 39, and disposed within each bore 39 is a piston or ball 41, it being understood that the present invention is equally applicable to a radial piston or a radial ball type of device. The balls 41 are in engagement with, and restrained in their radial travel, by a concave surface on a race member 43, which is disposed within a cam ring 45. The cam ring 45 is disposed to pivot about the axis of a cam pivot pin 47 (shown only in FIG. 2), the pin 47 being received within a pair of aligned bores defined by the pump cover 15 and the manifold body 19. As is generally well-known to those skilled in the art, pivotal movement of the cam ring 45 varies the displacement and output fluid flow of the pump 11, for any given input speed. Pivotal movement of the cam ring 45 about the axis of the pivot pin 47 is accomplished by means of a displacement control assembly, generally designated 49 (shown only in FIG. 2). Such displacement controls are well known to those skilled in the art, are not an essential feature of the invention, and therefore, will be described only briefly herein. The displacement control assembly 49 includes a control shaft 51, which extends through the pump cover 15 for connection to a linkage arrangement (not shown herein). Appropriate movement of the linkage rotates the control shaft 51 about its axis of rotation, thereby causing angular displacement of a pin 53 which is received in an opening 55 defined by the cam ring 45. Thus, rotation of the control shaft 51 results in pivotal movement of the cam ring 45 about the cam pivot pin 47 in a known manner, to vary the displacement of the pump 11 from its neutral (zero displacement) position shown in FIG. 2.

Assuming the control shaft 51 is rotated clockwise (thus pivoting the cam ring 45 counter-clockwise about the pivot pin 47), the operation of the pump 11 will now be described. As the input shaft 25 rotates, the pump rotor 31 rotates, with some of the balls 41 moving radially outward in their respective cylinder bores 39, drawing inlet fluid from the axial bore 35. At the same time, certain of the balls 41 are being displaced radially inwardly, thus pumping pressurized fluid from their respective cylinder bores 39 into the axial bore 37. Fluid communication from the axial bore 35 to the outwardly moving balls 41 is by means of a pump slot 57 defined by the journal member 33. Similarly, communication of pressurized fluid from the inwardly moving balls 41 to the axial bores 37 is by means of a pump slot 59, defined by the journal member 33.

Figure 3:
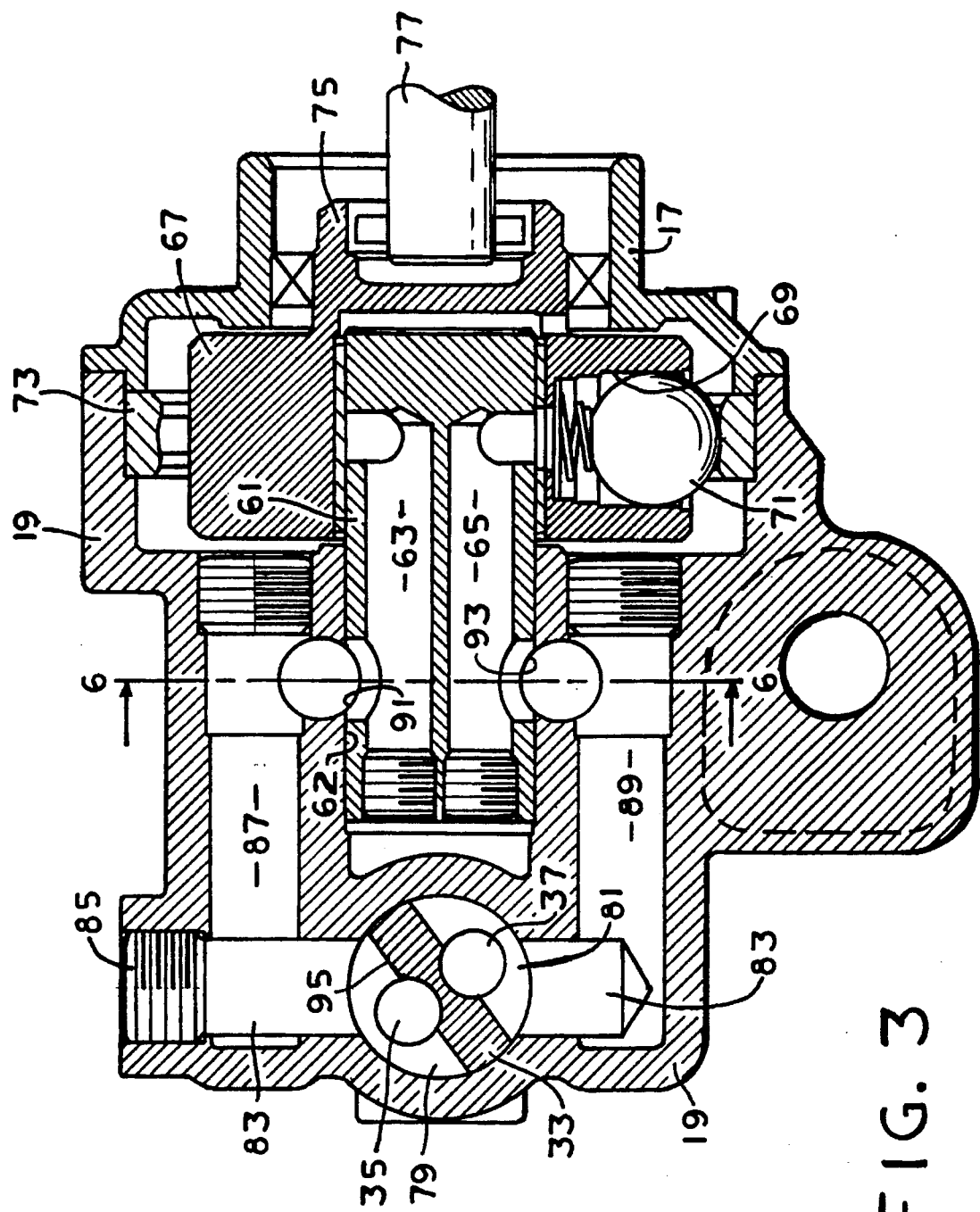
FIG. 3 is an axial cross-section, taken on line 3—3 of FIG. 1, and on the same scale.

Referring now to FIG. 3, in conjunction with FIG. 1, the hydrostatic motor 13 is a fixed-displacement motor, but is otherwise of the same general construction as the pump 11. Thus, the motor 13 includes a cylindrical support member 61 (also referred to hereinafter as a journal member), which is press-fit into a cylindrical journal bore 62 defined by the manifold body 19. The support member 61 defines a pair of axially extending bores 63 and 65, and a pair of housing slots 64 and 66 (labelled only in FIG. 6) communicating with the axial bores 63 and 65, respectively. As is well known to those skilled in the art, the construction of the motor support member 61 may be substantially the same as that of the pump support member 33.

Rotatably supported on the support member 61 is a motor rotor 67 which defines a plurality of cylinder bores 69, with a piston or ball 71 being disposed reciprocally within each of the bores 69. The balls 71 are restrained in their radial travel by a concave surface of a race member 73, the race member 73 being seated within a recess in the manifold body 19, and restrained axially therein by the motor cover 17. The motor rotor 67 includes an output portion 75, by means of which the rotor 67 can drive an output shaft 77 (shown in FIG. 3, but omitted from FIG. 1) by any suitable means, which is well known to those skilled in the art and will not be illustrated or described herein.

Referring still primarily to FIGS. 1 and 3, the lower portion of the journal member 33 defines a housing slot 79 in open communication with the axial bore 35, and a housing slot 81 in open communication with the axial bore 37. The housing slots 79 and 81 could also be referred to as "motor slots" but are not so referenced herein because they are not in direct communication with the motor 13. By means of the opposite ends of a cross bore 83, which is plugged at its upper end in FIG. 3 by means of a threaded plug 85, the bore 35 and housing slot 79 are in communication with a passage 87, while the axial bore 37 and housing slot 81 are in fluid communication with a passage 89.

Figure 6:
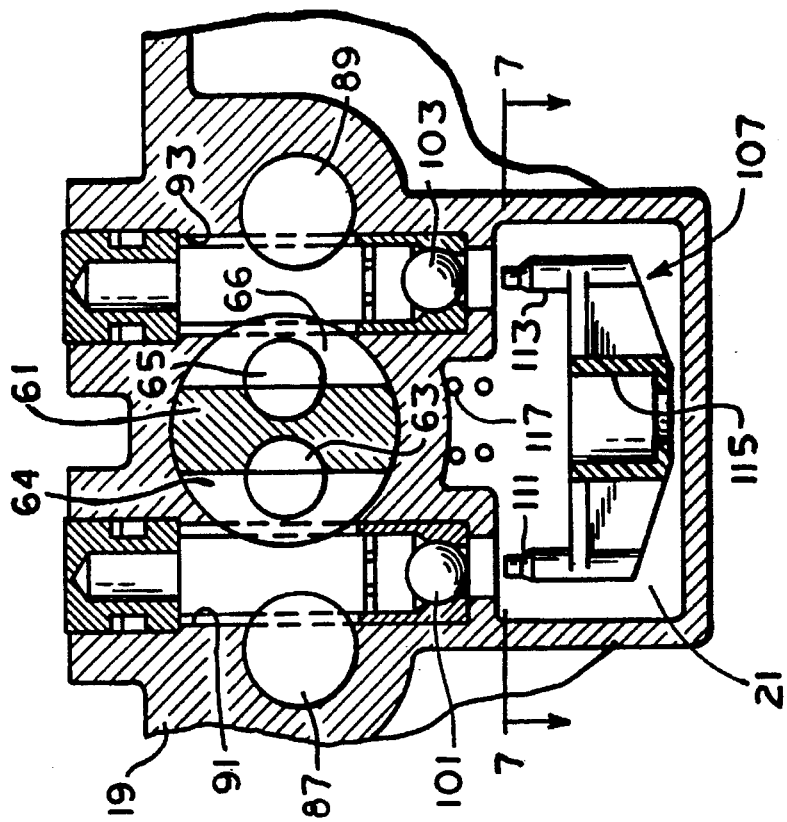
FIG. 6 is a transverse cross-section, taken on line 6—6 of FIG. 3, and on line 6—6 of FIG. 7, and on the same scale, illustrating the improved dump valve of the present invention.

Referring now also to FIG. 6, the passage 87 is in fluid communication with the axial bore 63 of the support member 61 by means of a vertical bore 91, and similarly, the passage 89 is in fluid communication with the axial bore 65 by means of a vertical bore 93. Thus, with the input shaft 29 rotating clockwise, as was described previously, pressurized fluid is communicated through the axial bore 37, then through the cross bore 83, the passage 89, the vertical bore 93, then through the axial bore 65 to those cylinders 69 of the motor 15 in which the ball 71 is moving radially outward, as is well known to those skilled in the art. At the same time, in the case of those cylinders 69 in which the ball 71 is moving radially inward, low pressure exhaust fluid is being communicated through the axial bore 63, then through the vertical bore 91, through the passage 87, then through the cross bore 83, the housing slot 79, and through the axial bore 35 to the inlet of the pump 11, also in a manner well known to those skilled in the art. As a result, the output shaft 77 of the motor 13 is driven in what will be considered hereinafter the "forward" direction.

Referring again primarily to FIGS. 2 and 3, it should be noted that the axial bores 35 and 37 are "straight" (as illustrated in FIG. 1), and that the bores 35 and 37 are oriented at approximately a 45° angle, i.e., a plane interconnecting the axes of the bores 35 and 37 would be oriented at approximately 45° to a transverse plane passing through the axis of the support member 33. Such a plane would be oriented vertically in both FIGS. 2 and 3. In FIGS. 2 and 3, it may be seen that both the pump slots 57 and 59 and the housing slots 79 and 81 are oriented approximately perpendicular to the axial bores 35 and 37. In other words, the housing slot 79 includes a bottom surface 95 (see FIG. 3) and that bottom surface 95, as well as the bottom surfaces of the other slots 57, 59 and 81 are all oriented approximately perpendicular to the imaginary plane passing through the axial bores 35 and 37.

The above-described relationship of the axial bores 35 and 37 and slots 57, 59, 79, and 81 is the conventional relationship which has been in use commercially and has the following result. With the input shaft 29 rotating clockwise in FIG. 2, rotation of the control shaft 51 in a clockwise direction will result in pivotal movement of the pin 53 as indicated by the arrow in FIG. 2, and fluid will flow as described previously, resulting in rotation of the output shaft 77 in the forward direction.

In accordance with one important aspect of the present invention, and as was discussed in the BACKGROUND OF THE DISCLOSURE, in certain vehicle applications, it is desirable for the control shaft 51 to be connected to a linkage which moves in a direction opposite to what is "normal", wherein the resulting rotation of the control shaft 51 in the counter-clockwise direction (as viewed in FIG. 2) will result in rotation of the output shaft 77 in the forward direction. In accordance with the present invention, such may be accomplished by "replacing" the support member 33, having the construction shown in FIGS. 2 and 3, with a modified support member or journal member 33' having the construction shown in the fragmentary views of FIGS. 4 and 5. As used herein, it will be understood that reference to the journal member 33 being "replaced" by the modified journal member 33' typically means that, during the assembly of hydrostatic transmissions to be used with the "opposite" linkage, the modified journal member 33' will be inserted in the manifold body 19, rather than the standard journal member 33.

Figure 5:
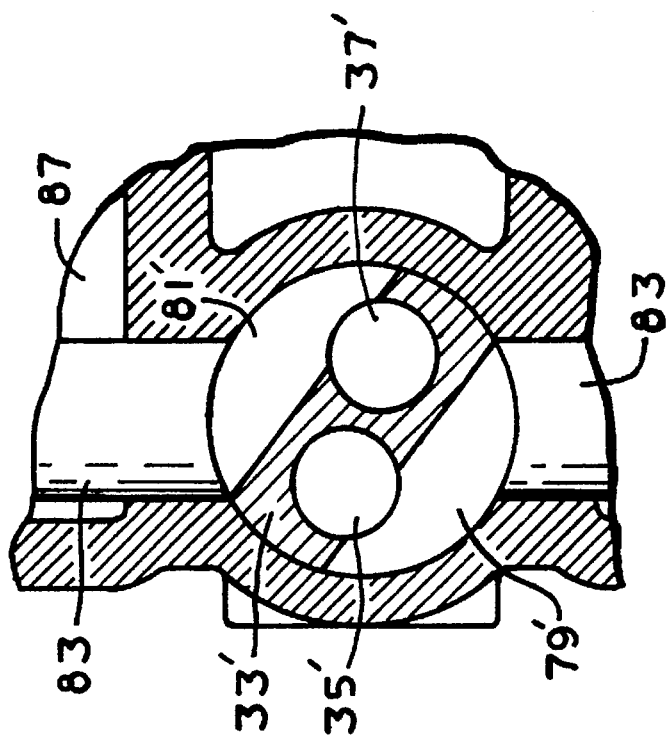
FIG. 5 is a fragmentary axial cross-section, similar to FIG. 3, but on the same scale as FIG. 4, further illustrating the one aspect of the present invention.
Figure 4:
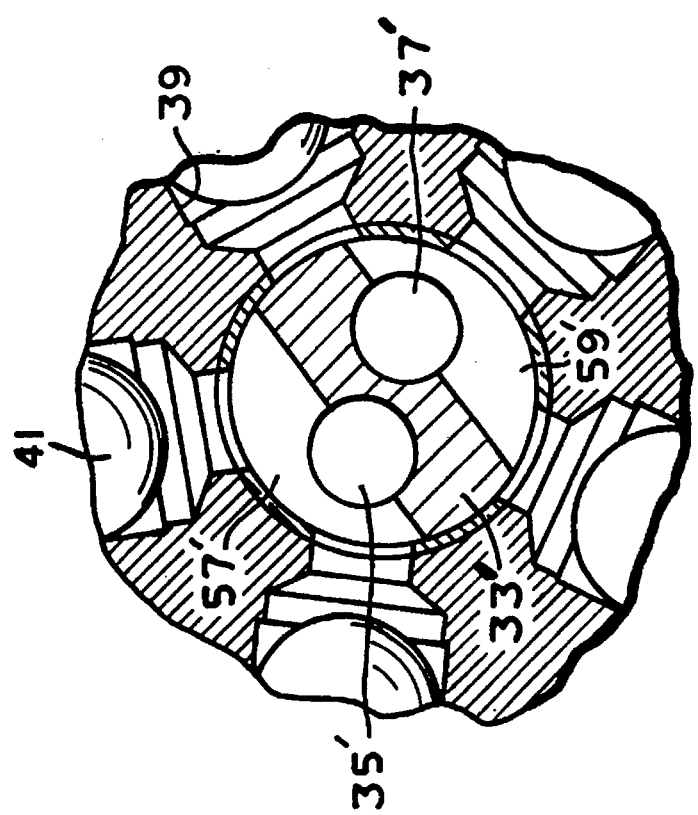
FIG. 4 is a fragmentary transverse cross-section, similar to FIG. 2, but on a larger scale, illustrating one aspect of the present invention.

Referring now primarily to FIGS. 4 and 5, it should be noted that those figures are oriented the same as FIGS. 2 and 3, respectively, but are enlarged relative thereto. In FIG. 4 it may be seen that the modified journal member 33' defines pump slots 57' and 59', and by comparing FIG. 4 to FIG. 2, it may be seen that the slots 57' and 59' are oriented the same as were the slots 57 and 59 in FIG. 2. However, in the modified or "reverse" journal member 33' of FIGS. 4 and 5, the axial bores 35' and 37' are not perpendicular to the pump slots 57' and 59', as was the case with the journal member 33. Instead, the plane containing the axes of the bores 35' and 37' is oriented at an acute angle to the pump slots 57' and 59'. In the subject embodiment, the acute angle is approximately 45°.

Referring now primarily to FIG. 5, the reverse journal member 33 defines housing slots 79' and 81', which are displaced about 90° from the position of the housing slots 79 and 81, as shown in FIG. 3. The pump slots 79' and 81' also define an acute angle relative to the plane containing the axes of the bores 35' and 37'.

Viewing the reverse journal member 33', as shown in FIGS. 4 and 5 in the context of FIGS. 2 and 3, the operation of the present invention, including the reverse journal member 33' in place of the regular journal member 33, will be described. Assuming the control shaft 51 is rotated counterclockwise (thus pivoting the cam ring 45 clockwise about the pivot pin 47), the balls in the cylinders communicating with the pump slot 59' are now moving radially outwardly, drawing inlet fluid from the axial bore 37'. At the same time, the remainder of the balls 41 are being displaced radially inwardly, thus pumping pressurized fluid from their respective cylinder bores 39 into the pump slot 57' and the axial bore 35'.

The pressurized fluid flows from the axial bore 35' into the housing slot 79', which is in fluid communication through the cross-bore 83, passage 89, etc., with the cylinders in the motor 13 in which the balls 71 are moving radially outward. At the same time, fluid is exhausted from those cylinders 69 in which the ball 71 is moving radially inward, with the low-pressure exhaust fluid flowing back through the passage 87, through the upper end of the cross-bore 83, and into the housing slot 81'. From there, low-pressure fluid flows through the axial bore 37' and back up to the pump slot 59', ready to enter the expanding cylinders of the pump 11.

Thus, it may be seen that the motor 13 is still driven in the forward direction, even with the direction of input to the displacement control assembly 49 being reversed, simply by inserting the reverse journal member 33' in place of (instead of) the journal member 33. No other change or modification of any part of the hydrostatic transmission is required, in order to accommodate such reversed direction of input to the displacement control assembly 49. Furthermore, it has been determined in connection with the development of the present invention that the modified reverse journal member 33' does not detract in any way from the efficiency (either volumetric or mechanical) of the pump 11, or of the overall hydrostatic transmission.

Although the present invention has been described in connection with a situation in which the vehicle OEM wishes to utilize a reversed input to the displacement control assembly 49, the reverse journal member 33' could also be used in a situation where the vehicle OEM wishes to use "normal" input to the displacement control assembly 49, but is utilizing a vehicle engine which provides an input to the input shaft 25 of the pump 11 which is "reversed" from what is normal. In other words, if the standard, commercially available engine provides a clockwise rotation of the input shaft 25 (looking down in FIG. 1), some vehicle OEM's may have an engine which provides a counterclockwise input. In that case, the reverse journal member 33' may be used in conjunction with the counterclockwise input to the pump 11, and the direction of rotation of the output shaft 77 will still correspond to what is considered the "normal" forward direction of operation. Therefore, references hereinafter and in the appended claims to a "forward input" or "reverse input" will be understood to refer to either the input to the displacement control assembly 49 or to the input shaft 25 of the pump 11.

Also, although the present invention has been described in connection with replacing the journal member 33 of the pump 11, those skilled in the art will appreciate that the invention is not so limited, and that the journal member 61 of the motor 13 could be replaced by a reverse journal member (made generally in accordance with the teachings of FIGS. 4 and 5, and the functional result would be the same. In other words, by utilizing a normal pump journal 33 but a reverse motor journal, if either the input to the displacement control assembly 49 or the input drive to the input shaft 25 is reversed, the output shaft 77 will rotate in the "forward" direction. It will also be understood by those skilled in the art that if both inputs are reversed, then it is necessary to utilize both the normal pump journal and the normal motor journal in order for the output shaft 77 to operate in the forward direction.

Figure 7:
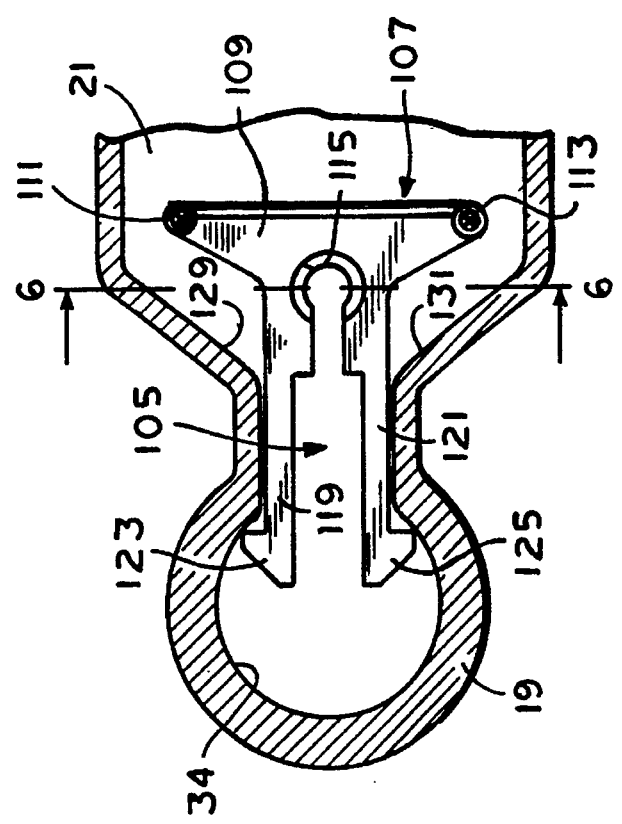
FIG. 7 is a fragmentary axial cross-section, taken on line 7—7 of FIG. 6, and on the same scale.
Figure 8:
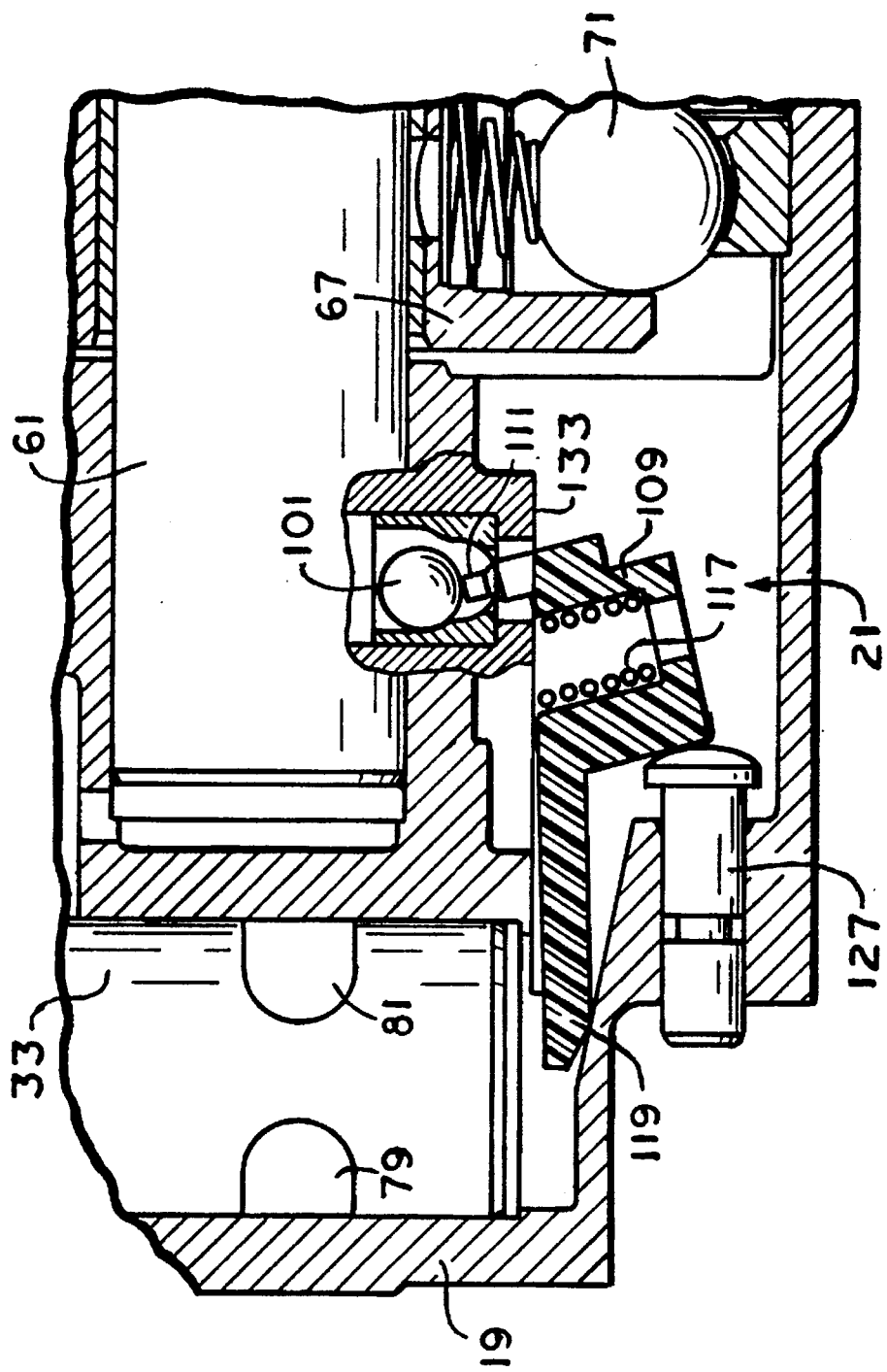
FIG. 8 is a fragmentary axial cross-section, similar to FIG. 1, illustrating the dump valve of the present invention in its unloading position.

FIGS. 6 through 8

Referring now primarily to FIGS. 6 and 7, in conjunction with FIG. 1, the improved dump valve (unloading valve) of the present invention will be described. Disposed within the lower end of the vertical bore 91 is a check valve assembly including a ball check valve 101, and similarly, disposed in the lower end of the vertical bore 93 is a check valve assembly including a ball check valve 103. As is explained in the BACKGROUND OF THE DISCLOSURE, and as is well known to those skilled in the art, the function of a dump valve is to unseat, simultaneously, both of the ball check valves 101 and 103, such that both sides of the hydrostatic loop (i.e., bores 63 and 65) are in communication with each other through the case chamber 21, which is also in communication with the system reservoir.

Referring now primarily to FIG. 7, disposed axially between the lower end of the cylindrical journal bore 34 and the case chamber 21 is a narrow opening, which will be referred to hereinafter as an insertion chamber 105 (see also FIG. 1). As may best be seen in FIG. 1, although not an essential feature of the invention, from the bottom of the bore 34, there is a step-down to the bottom of the insertion chamber 105, and from there a further step-down to the bottom surface of the case chamber 21.

Disposed within the continuous open region defined by the bore 34 and the chambers 21 and 105 is a dump valve member generally designated 107, which is preferably formed as a single unitary member. For example, the dump valve member 107 may be an injection-molded plastic part or may be formed from some other suitable material, as long as the resulting part has the necessary resilience or "springiness" to perform the function to be subsequently described.

The dump valve member 107 includes a main dump portion 109, including a pair of upstanding projections 111 and 113, illustrated herein as being generally cylindrical, the function of which will be subsequently described. The dump portion 109 defines a generally cylindrical recess 115 in which, as is shown primarily in FIG. 1, there is disposed a coiled compression spring 117, the function of which is to normally bias the dump valve member 107 "downward" to the position shown in FIGS. 1 and 6.

Formed integrally with the dump portion 109 is a pair of axially-extending legs 119 and 121, which pass through the insertion chamber 105, the legs 119 and 121 comprising the means for mounting the dump valve member 107. The legs 119 and 121 terminate, at their forward end (left end in FIGS. 1 and 7) in a pair of retention portions 123 and 125, respectively, shown only in FIG. 7. With the dump valve member 107 in the assembled position shown in FIG. 7, the retention portions 123 and 125 engage the journal bore 34 in such a way as to prevent movement of the member 107 to the right in FIG. 7. At the same time, the dump valve member 107 is prevented from moving any further "forwardly" (i.e., to the left in FIGS. 1 and 7) by the engagement of the forward surface of the dump portion 109 with a generally cylindrical actuator member 127.

It is an important aspect of the present invention that the legs 119 and 121 be "resiliently deflectable," which can mean either that the legs themselves are resilient or deflectable or, as is the case in the subject embodiment, the legs themselves remain relatively straight but the dump portion 109 is itself somewhat deformable as the legs 119 and 121 are moved closer together, as will be subsequently described. Another important aspect of the dump valve member 107 of the present invention is its simplicity in terms of the number of parts and the ease of assembly.

Referring now primarily to FIG. 7, prior to assembly, the entire dump valve member 107 is disposed in the case chamber 21, with the retention portions 123 and 125 being disposed in engagement with the angled wall surfaces 129 and 131, respectively. Prior to assembly, the compression spring 117 is already disposed within the cylindrical recess 115, and during the assembly process, the upper surface of the spring 117 merely slides along an undersurface 133 of the manifold body 119, the undersurface 133 being shown best in FIG. 1.

In order to insert the dump valve member 107 to its "assembled" position shown in FIG. 7, the member 107 may be merely pushed or moved manually from its preassembled position to the left in FIG. 7, which will cause the legs 119 and 121 to be deflected "inward" (i.e., toward each other) far enough so that the outside surfaces of the retention portions 123 and 125 engage the inside walls of the insertion chamber 105. The dump valve member 107 is moved further forward until it reaches the position shown in FIG. 7, at which point the resiliently deflectable legs move outward, returning to, or nearly to, their pre-assembly position. In other words, the entire assembly process merely requires manually inserting the member 107 until it "snaps" into place. With the dump valve member 107 in the assembled position of FIG. 7, the retention portions 123 and 125 are now in engagement with the journal bore 34, providing the retention function described previously.

Referring now primarily to FIGS. 1, 6 and 8, the actuation of the dump valve member 107 will be described. It should be noted that the retention portions 123 and 125 perform the additional function of providing a pivot point, about which the rest of the member 107 can pivot during actuation. FIGS. 1 and 6 represent the unactuated position of the dump valve 107, with the compression spring 117 biasing the dump valve downwardly and indirectly biasing the actuator member 127 forwardly (to the left in FIG. 1). Actuation of the dump valve is accomplished simply by moving the actuator member 127 to the right in FIGS. 1 and 8, thus pivoting the dump valve in a counterclockwise direction about the pivot points and causing the dump valve to move from the position shown in FIG. 1 to that shown in FIG. 8. As that pivotal movement occurs, the upstanding projections 111 and 113 move upward until the tips thereof engage the ball check valves 101 and 103, respectively, lifting them from their respective seats to the position shown in FIG. 8. With the ball check valves 101 and 103 both in the position shown in FIG. 8, both sides of the hydrostatic loop are connected to each other and to the system reservoir through the case chamber 21, as was previously described and as is well known to those skilled in the art. With the dump valve member 107 in the actuated position of FIG. 8, the vehicle may be pushed or towed without having to overcome the dynamic braking effect of the pump 11 and motor 13, which would result if the ball check valves 101 and 103 were seated, thus closing the hydrostatic loop.

After the vehicle has been towed or pushed and it is again desired to propel the vehicle by means of the hydrostatic transmission, the dump valve 107 may be returned to its unactuated position merely by releasing the actuator member 127 and permitting the compression spring 117 to again bias the dump valve 107 to the unactuated position shown in FIG. 1. This will permit the ball check valves 101 and 103 to return to engagement with their respective seats, and if the vehicle is then to be propelled in a forward direction, as previously described, pressurized fluid flows through the passage 89, then through the vertical bore 93 into the axial bore 65. The pressurized fluid causes the ball check valve 103 to tightly engage its seat, while on the other side of the loop, there is low-pressure fluid in the axial bore 63, the vertical bore 91, and the passage 87. Therefore, the ball check valve 101 is only lightly engaging its seat and if pressure on the low-pressure side of the loop drops below the case or reservoir pressure, make-up fluid can flow from the case chamber 21 into the vertical bore 91 to prevent cavitation within the closed loop, in a manner which is well known to those skilled in the art.

Alternatively, it would be within the scope of the present invention for the dump valve member and the adjacent housing to be configured such that assembly of the dump valve member would initially involve resiliently deflecting the legs away from each other and then permitting them to be returned to their normal position, engaging a portion of the housing disposed between the legs, and pivoting thereabout.

The invention has been described in great detail in the foregoing specification, and it is believed that various alterations and modifications of the invention will become apparent to those skilled in the art from a reading and understanding of the specification, It is intended that all such alterations and modifications are included in the invention, insofar as they come within the scope of the appended claims.

We claim:

1. A hydrostatic transmission comprising a housing assembly, a variable displacement radial piston pump and a fluid pressure operated motor disposed in said housing assembly; said radial piston pump including displacement varying means operable to vary the displacement of said pump, including reversible control means operable to move said displacement varying means in first and second opposite directions, in response to movement of said control means in first and second opposite directions from a neutral position; said motor defining a fluid inlet and a fluid outlet, and said housing assembly defining high and low pressure passages in fluid communication with said fluid inlet and said fluid outlet, respectively; said pump comprises a rotor assembly rotatably mounted on a journal member disposed within a journal bore defined by said housing assembly, said journal bore providing open fluid communication with both of said high and low pressure passages; said journal member defining high and low pressure pump slots in fluid communication with contracting and expanding chambers, respectively, of said pump, said journal member further defining high and low pressure housing slots in fluid communication with said high and low pressure passages, respectively, and said journal member defining a high pressure axial bore interconnecting said high pressure pump and housing slots, and a low pressure axial bore interconnecting said low pressure pump and housing slots; characterized by: said journal member is an element selected from a group consisting of:

(a) a first journal member in which said axial bores are oriented generally perpendicular to said pump slots, and said housing slots are oriented generally perpendicular to said axial bores, whereby said hydrostatic transmission operates in a forward direction in response to movement of said control means in said first direction from said neutral position; and, (b) a second journal member in which said axial bores are oriented at an acute angle relative to said pump slots and said housing slots are oriented at an acute angle relative to said axial bores whereby said hydrostatic transmission operates in said forward direction in response to movement of said control means in said second direction from said neutral position.

2. A hydrostatic transmission as claimed in claim 1, characterized by said acute angle of said axial bores relative to said pump slots comprises about forty-five degrees.

3. A hydrostatic transmission as claimed in claim 2, characterized by said acute angle of said housing slots relative to said axial bores comprises about forty-five degrees.

4. A hydrostatic pump or motor unit of the radial piston type comprising a housing assembly defining high and low pressure passages; said hydrostatic unit comprises a rotor assembly rotatably mounted on a journal member disposed within a journal bore defined by said housing assembly, said journal bore providing open fluid communication with both of said high and low pressure passages; said journal member defining first and second slots in fluid communication with contracting and expanding chambers of said hydrostatic unit; said journal member further defining first and second axial bores and first and second passages providing fluid communication between said first and second axial bores and said high and low pressure passages characterized by: said journal member is an element selected from a group consisting of:

(a) a first journal member in which said first axial bore is in fluid communication with said first slot and said first passage is in fluid communication with said low pressure passage, and said second axial bore is in fluid communication with said second slot and said second passage is in fluid communication with said high pressure passage, whereby said hydrostatic unit operates in a forward direction in response to a forward input; and (b) a second journal member in which said first axial bore is in fluid communication with said first slot and said first passage is in fluid communication with said high pressure passage, and said second axial bore is in fluid communication with said second slot and said second passage is in fluid communication with said low pressure passage, whereby said hydrostatic unit operates in a forward direction in response to a reverse input.

5. A hydrostatic pump or motor unit as claimed in claim 4, characterized by, in said first journal member, said axial bores are oriented generally perpendicular to said first and said second slots, and said first and said second passages comprise slots oriented generally perpendicular to said axial bores.

6. A hydrostatic pump or motor unit as claimed in claim 4, characterized by, in said second journal member, said axial bores are oriented at an acute angle relative to said first and second slots, and said first and second passages comprise slots oriented at an acute angle relative to said axial bores.

7. A hydrostatic transmission comprising a housing assembly, a variable displacement radial piston pump and a fluid pressure operated motor disposed in said housing assembly; said radial piston pump including displacement varying means operable to vary the displacement of said pump, including reversible control means operable to move said displacement varying means in first and second opposite directions, in response to movement of said control means in first and second opposite directions from a neutral position; said motor defining a fluid inlet and a fluid outlet, and said housing assembly defines high and low pressure passages in fluid communication with said fluid inlet and said fluid outlet, respectively; said pump comprises a rotor assembly rotatably mounted on a journal member disposed within a journal bore defined by said housing assembly, said journal bore providing open fluid communication with both of said high and low pressure passages; said journal member defining high and low pressure pump slots in fluid communication with contracting and expanding chambers, respectively, of said pump, said journal member further defining first and second axial bore, and first and second passages interconnecting said pump slots and said high and low pressure passages; characterized by: said journal member is an element selected from a group consisting of:

(a) a first journal member in which said first axial bore is in fluid communication with said low pressure pump slot and said first passage is in fluid communication with said first axial bore and with said low pressure passage, and said second axial bore is in fluid communication with said high pressure pump slot and said second passage is in fluid communication with said second axial bore and with said high pressure passage; whereby said hydrostatic transmission operates in a forward direction in response to movement of said control means in said first direction from said neutral position; and (b) a second journal member in which said first axial bore is in fluid communication with said high pressure pump slot and said first passage is in fluid communication with said first axial bore and with said high pressure passage, and said second axial bore is in fluid communication with said low pressure pump slot and said second passage is in fluid communication with said second axial bore and with said low pressure passage, whereby said hydrostatic transmission operates in said forward direction in response to movement of said control means in said second direction.

8. A hydrostatic transmission as claimed in claim 7, characterized by, in said first journal member, said first and second passages comprise slots oriented generally parallel to each other, and generally perpendicular to said axial bores.

9. A hydrostatic transmission as claimed in claim 7, characterized by, in said second journal member, said first and said second passages comprise slots oriented generally parallel to each other, and oriented at an acute angle relative to said axial bores.

10. A hydrostatic transmission comprising a housing assembly, a fluid pressure operated pump and a fluid pressure operated motor disposed in said housing assembly; said pump defining a fluid inlet and a fluid outlet and said motor defining a fluid inlet and a fluid outlet; said housing assembly defining a case chamber, a first passage means providing fluid communication from said pump fluid outlet to said motor fluid inlet, and a second passage means providing fluid communication from said motor fluid outlet to said pump fluid inlet; first check valve means operable to permit fluid communication from said case chamber to said first passage, in the absence of fluid pressure in said first passage, and second check valve means operable to permit fluid communication from said case chamber to said second passage, in the absence of fluid pressure in said second passage; and a dump mechanism operably associated with said first and second check valve means to open both of said check valve means simultaneously in response to an input; characterized by:

(a) said housing assembly defining an insertion chamber adjacent said case chamber, and in open communication therewith, and further defining retention means, said insertion chamber being disposed between said case chamber and said retention means;

(b) said dump mechanism comprising a unitary dump member including:
 (i) a dump portion including first and second projecting portions disposed for unseating engagement with said first and second check valve means, respectively, in response to movement of said dump portion towards said check valve means; and
 (ii) a pair of resiliently deflectable mounting portions, each including a retention member, said mounting portions being deflectable during insertion thereof through said insertion chamber until said retention members engage said retention means, said unitary dump member thereafter being pivotable about said retention members;

(c) said dump mechanism including means biasing said dump portion away from said check valve means; and (d) said dump mechanism including means operable in response to said input to cause said dump member to pivot about said retention members and move said projecting portions toward said check valve means.

11. A hydrostatic transmission as claimed in claim 10, characterized by said fluid pressure operated pump comprises a radial piston pump, and said fluid pressure operated motor comprises a radial piston motor.

12. A hydrostatic transmission as claimed in claim 11, characterized by said housing assembly and said radial piston pump include a pump journal member defining first and second axial bores, said first passage including said first axial bore, and said second passage including said second axial bore.

13. A hydrostatic transmission as claimed in claim 12, characterized by said housing assembly defining a pump journal bore in which is disposed said pump journal member of said radial piston pump, a terminal portion of said pump journal bore extending axially beyond said pump journal member, and being in open communication with said insertion chamber, the junction of said insertion chamber and said terminal portion of said pump journal bore comprising said retention means.

14. A hydrostatic transmission as claimed in claim 11, characterized by said housing assembly and said radial piston motor include a motor journal member defining first and second axial bores, said first passage means including said first axial bore, and said second passage means including said second axial bore.

15. A hydrostatic transmission as claimed in claim 14, characterized by said housing assembly defining a motor journal bore in which is disposed said motor journal member of said radial piston motor, said first and second check valve means comprising first and second check valve bores, respectively, said check valve bores intersecting said motor journal bore on opposite sides thereof.

16. A hydrostatic transmission as claimed in claim 10, characterized by said unitary dump member comprising a molded plastic member, said resiliently deflectable mounting portions being elongated and oriented generally parallel to each other.

17. A hydrostatic transmission as claimed in claim 16, characterized by said elongated mounting portions each being formed integrally with said dump portion, and being resiliently deflectable toward each other during insertion thereof through said insertion chamber.

18. A hydrostatic transmission as claimed in claim 17, characterized by said retention members being formed integrally with said elongated mounting portions, and extending laterally therebeyond, the overall dimension of said retention members, prior to insertion, being greater than the lateral dimension of said insertion chamber, whereby, insertion of said retention members and said mounting portions through said insertion chamber causes said mounting portions to deflect resiliently toward each other, until said retention members are beyond said insertion chamber.

* * * * *